United States Patent [19]

Beckerman et al.

[11] Patent Number: 4,801,483
[45] Date of Patent: Jan. 31, 1989

[54] HIGH STRENGTH, LIGHT WEIGHT STRUCTURAL COMPOSITE AND METHOD OF PREPARING SAME

[75] Inventors: Norton S. Beckerman, Vienna, Va.; William H. Griffin, Bellevue, Wash.

[73] Assignee: Power-Tel Products Group, Inc., Clearwater, Fla.

[21] Appl. No.: 14,704

[22] Filed: Feb. 13, 1987

[51] Int. Cl.⁴ .............................. B32B 3/00
[52] U.S. Cl. ........................ 428/71; 404/46; 428/73; 428/76; 428/117; 428/119; 428/138; 428/308.8; 428/417; 428/438; 428/537.1
[58] Field of Search ........... 428/138, 417, 438, 537.1, 428/71, 73, 76, 117, 119, 308.8; 404/46

[56] References Cited

U.S. PATENT DOCUMENTS

| | | | |
|---|---|---|---|
| 3,298,892 | 1/1967 | Lippay | 144/309 X |
| 3,325,037 | 6/1967 | Kohn et al. | 220/65 X |
| 3,376,185 | 4/1968 | Shook et al. | 428/259 X |
| 3,487,489 | 1/1970 | Kuhns | 94/5 |
| 3,616,111 | 10/1971 | Raech, Jr. | 404/41 X |
| 3,901,993 | 10/1975 | Phillips, Jr. | 404/25 X |
| 3,905,172 | 9/1975 | Blackburn | 404/46 X |
| 4,209,486 | 6/1980 | Ross | 264/279.1 X |
| 4,271,649 | 6/1981 | Belanger | 428/537.1 X |
| 4,343,846 | 8/1982 | Kohn | 428/531.1 X |
| 4,533,589 | 10/1985 | Sewell | 428/174 |

FOREIGN PATENT DOCUMENTS 793014  8/1968  Canada ................... 404/46

Primary Examiner—Marion C. McCamish
Attorney, Agent, or Firm—Anthony J. De Laurentis

[57] ABSTRACT

A light weight structural composite comprised of a cellular core having high dynamic load-bearing properties and a fiber reinforced resinous skin on all edges of the core and on the top and bottom surfaces thereof. The cellular core may comprise an array of balsa wood blocks, the skin may comprise a fiberglass reinforced epoxy or polyester resin, and the core and skin may be formed into a monolithic composite which is particularly suitable for use as a high strength to weight ratio ground opening cover.

13 Claims, 2 Drawing Sheets

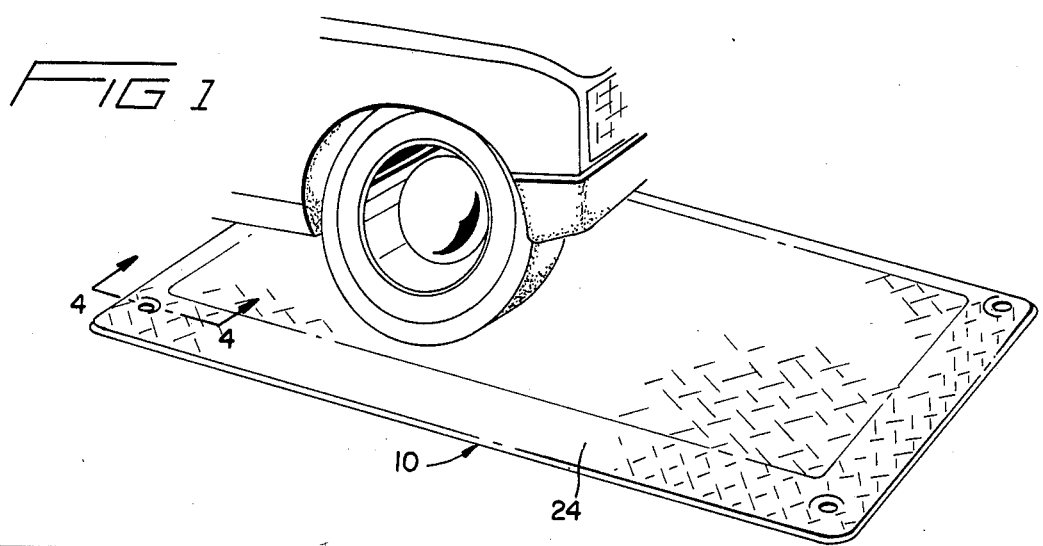
FIG 1
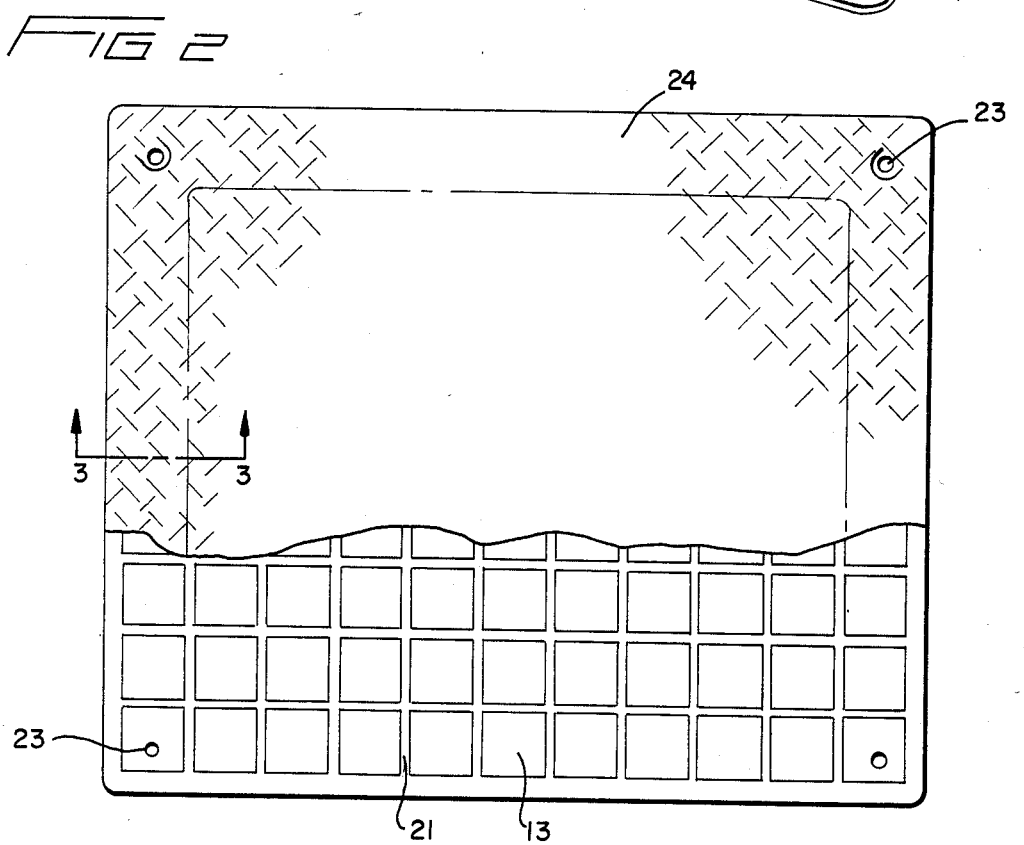
FIG 2
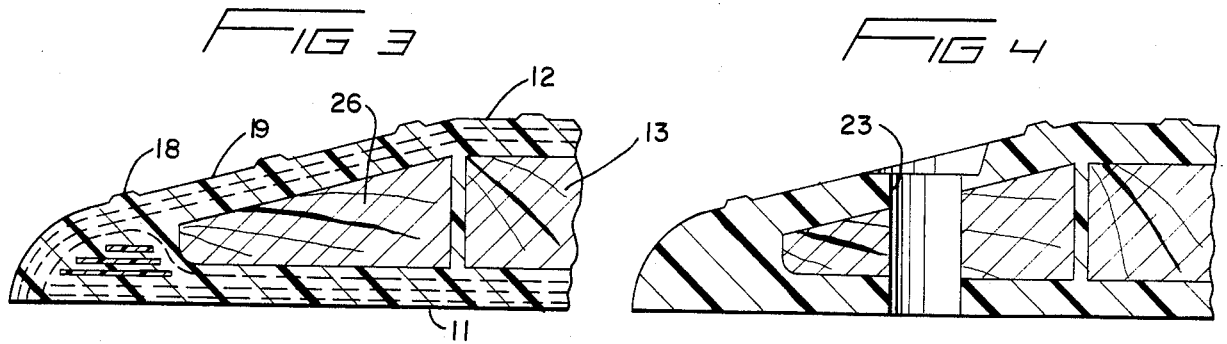
FIG 3
FIG 4

HIGH STRENGTH, LIGHT WEIGHT STRUCTURAL COMPOSITE AND METHOD OF PREPARING SAME

BACKGROUND OF THE INVENTION

This invention relates generally to structural composites and, more particularly, to structural composites formed by a fiber reinforced resinous material which is chemically fused or bonded to the exposed edge, top and bottom surfaces of a cellular core material to provide a light weight monolithic composite of exceptionally high strength and load-bearing properties. The invention also relates to the process for preparing such composites.

Fiber reinforced composites are well known materials which are suitable for use in many industrial and structural applications. Generally speaking such composites are quite strong in relation to their weight and are formed by curing a resinous matrix material which has been impregnated into a mat, layer or other mass of reinforcing fibers. In addition to the reinforcing fibers and resin matrix, composites often include non-fiber reinforcing agents and/or core materials such as wood veneers, plastic chips, metal foil, cellular and non-cellular beads or the like as a means for tailoring the physical properties of the resulting composites. In such composites, the non-fiber reinforcing and/or core material generally are embedded or encapsulated in or otherwise surrounded by the fiber reinforced resinous matrix material.

There is a variety of resinous matrix materials, as well as reinforcing fiber and non-fibrous reinforcing and core materials, which have been used in the presentation of fiber reinforced composites, the selection of the various possible materials generally being dictated by the desired end use of a given composite.

Typically, glass, carbon, boron, metal or polymeric fibers, such as polyester or polyamide (nylon) fibers, are used as the reinforcing fibers. The fibers may be used, for example, in the form of rovings, mats, batts, woven and non-woven webs, or the like.

The resins which are used as the matrix materials normally comprise various heat hardenable epoxies, phenolics, nylons, polyesters, polyurethanes and polysulfides. The materials are well known and are readily available in commerce.

Typical non-fibrous reinforcing or core materials include hardwood or softwood veneers and blocks, metal foils, cellular and non-cellular polymeric beads, cellular and non-cellular polymeric particles or chips, metallic or polymeric honeycomb structures or the like. A particularly useful core material for preparing composites characterized by exceptionally light weight and high strength is balsa wood especially end-grain balsa wood, since it is dimensionally stable and has a cell structure which affords a combination of high rigidity and compressive and tensile strength that is superior to other materials of comparable density.

End-grain balsa-core structural materials are widely used in transportation and handling equipment, such as for floors of railroad cars, shipping containers, cargo pallets, bulkheads, doors and reefer bodies, as well as in a variety of other applications. These materials are also employed for structural insulation in aircraft applications, in housing and in boating. Balsa-core structural materials and methods for their preparation are described, for example, in U.S. Pat. Nos. 3,298,892 to Lippay, 3,325,037 to Kohn et al., 4,271,649 to Belanger, and 4,343,846, the disclosures of which are incorporated herein by reference.

Other patents which relate to fiber reinforced structural laminates and/or composites include U.S. Pat. Nos. 3,616,111 and 4,533,589. The disclosures of these patents are also incorporated herein by reference.

SUMMARY OF THE INVENTION

A primary object of this invention is to provide an improved structural composite of reduced weight and of high strength.

Another object is to provide a substantially monolithic composite panel having a high strength, low density core and a rigid, tough skin which is resistant to abrasion and penetration.

Yet another object is to provide a composite panel of the above type which is particularly adapted for use as a cover for a ground opening in a surface, such as a roadway carrying vehicular traffic.

Still another object is to provide a structural panel comprised of a fiber reinforced resinous skin material and a cellular core material, wherein the core material is characterized by a very high strength to weight ratio, and wherein the skin and core are so intimately fused or bonded to one another as to function as a monolithic mass.

Another object is to provide a technique for manufacturing exceptionally light weight, high strength structural panels of the above type.

Briefly stated, these and other objects and advantages are accomplished by a multi-step process wherein a low density, high strength core structure is integrally bonded within a fiber reinforced resin matrix to form the desired structural panel. In one aspect of the invention, the panel is formed upside down in a suitably configured mold by building up a first fiber reinforced skin layer. Thereafter, a cellular core structure is placed over the skin layer and a second fiber reinforced skin layer is formed over the core structure. The first and second skin layers are integrally bonded to the core structure and to each other at any points of contact so as to form an essentially monolithic mass which is completely free from any air pockets. In a preferred aspect of the invention, the mold has a generally square, rectangular or circular configuration and the cellular core structure is comprised of discrete balsa wood blocks which are arranged between the skin layers in a generally planar spaced array such that the periphery of the core structure is spaced from about 1 to about 3 inches from the side walls of the mold. The core blocks are also preferably arranged such that the space between adjacent blocks comprises a channel-shape having a width of from about 1/32 to about 7/16 inches, and such that the resin matrix material completely fills the channel-shaped spaces between adjacent core blocks.

The fiber reinforced skin layers are prepared by laying-up a fibrous roving, web, mat or the like with a hardenable resin. A variety of conventionally employed fibrous and resinous materials may be used, but in preferred aspects, the fibrous materials comprise fiberglass matts and rovings and the hardenable resins comprise filled or unfilled epoxies and polyesters.

DESCRIPTION OF THE DRAWINGS

The invention will be understood more fully by reference to the following detailed description of specific embodiments thereof taken in conjunction with the drawing wherein:

FIG. 1 is a partial perspective view illustrating a composite structural panel in accordance with the present invention, wherein the panel is being used as a roadway opening cover;

FIG. 2 is a top plan view of the panel of FIG. 1, the top fiber reinforced skin layer being partially cut away to expose the spaced, planar array of cellular core blocks;

FIG. 3 is a sectional view taken along line 3—3 of FIG. 1, illustrating a tapered peripheral edge portion of the panel, as well as the fibrous reinforcing material in the resin matrix, a core block which is tapered to conform to the general taper of the edge portion of the panel, and one form of an anti-skid tread pattern on the upper surface of the panel;

FIG. 4 is a sectional view taken along line 4—4 of FIG. 1, illustrating one form of an anchor hole passing through the edge portion of the panel for receiving means for anchoring the panel to the ground (the fibrous reinforcing material illustrated in Figure 3 has been deleted from this figure for the purpose of illustration only)

DESCRIPTION OF THE INVENTION

Figure 5:
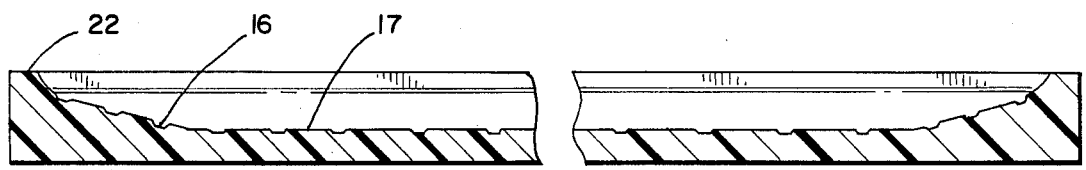
FIG. 5 is a partial sectional view illustrating one embodiment of a mold in which the panel of FIG. 1 may be formed.

Referring now to the drawing, there is shown a structural composite panel 10 in accordance with the invention. As shown most clearly in FIG. 3, the composite panel 10 consists of a fiber reinforced lower resinous skin layer 11 and a fiber reinforced resinous upper skin layer 12 which are integrally fused or bonded to a core structure comprised of a spaced array of cellular material having a high load-bearing strength, such as balsa wood blocks 13.

The panel 10 may be prepared in a suitably configured mold 14 (FIG. 5) such as a square, rectangular or circular mold having depressions 16 in the surface 17 thereof which correspond to the anti-skid tread projections 18 which are formed on the upper skin layer 12 of the panel 10. The panel is formed by first applying release coat to the inner mold surface 17 to facilitate clean removal of the finished panel therefrom. While numerous different release materials may be used for this purpose, the use of polyvinyl alcohol and various waxes as the release material is preferred. Suitable waxes include Carnauba-based waxes, such as that marketed by Ceara Products Inc. under the tradename CEARA, and that marketed under the trade designation Meguiar's Mirror Glaze. After the release coating has been applied, a gel coat is sprayed or brushed onto the release coat to a uniform thickness of about 5 to 30 mils, preferably from about 15 to 20 mils, and allowed to gel. The gel coat may be, for example, a polyester gel coat. Suitable polyester gel coats include those marketed by American Cyanamid Co., Plastics Division, under the trademark LAMINAC and designated EPX 117-8, and by Ram Chemicals under the trade designation RAM 66. Such gel coat materials have a gel time on the order of 5–15 minutes at 80° F. when catalyzed with a 1% solution of methyl ethyl ketone peroxide catalyst. After the gel coat has gelled, i.e., the resin solids partially polymerize to a substantially non-tacky state in which no resin adheres to the fingers when drawn over the gel coat, it should be allowed to further polymerize, i.e., cure, at a temperature between about 50° and about 150° F., preferably between about 70° and 120° F., for an additional 20–50 minutes. At this point, the depressions 16 in the mold surface 17 which correspond to the raised tread pattern or projections 18 on the upper skin layer 12 of the panel 10 are filled with a high strength fiberglass filled resin putty, preferably a putty that is also filled with finely divided silica. A suitable putty may be prepared by filling a polyester resin, such as that marketed by USX Corporation under the trade designation 12580, with chopped fiberglass and with a finely divided silica, such as those marketed under the trade designations CAB-O-SIL or AIR-O-SIL, respectively. After the resin putty has been allowed to set for about 10–20 minutes, a resin layer, which is preferably of the same composition as the resin used to prepare the resin putty, is then applied over the bottom of the mold and over the projections 18 that were prepared from the fiberglass filled resin putty. The resin layer should be on the order of about 5–20 mils thick and may be applied by brushing or spraying. A squeegee may be used to smooth the resin layer.

Prior to curing the resin layer, one or more layers of fiber reinforcing material 19 should be laid-up. The fiber reinforcing material may comprise a web, mat, roving, sheeting or the like made of metal, glass, boron, plastic, or carbon fibers. In preferred embodiments of this invention, the fiber reinforcing material will comprise fiberglass matting and fiberglass roving laid-up in a plurality of layers, e.g., three layers, wherein the first layer comprises a 1½ oz. per square yard fiberglass matting, wherein second layer comprises 36 oz. per square yard fiberglass roving, and wherein the third layer comprises another 1½ oz. fiberglass matting. The fiberglass matting may be of the type which employs a high solubility polyester binder and which is marketed by PPG Industries. The fiberglass roving may be of the type which is treated with a saline coupling agent to ensure integral bonding with the resin matrix material. Roving of this type is available commercially, for example, from Marine Fiberglass under the trade designation No. 3673.

Preferably, a layer of resin is brushed or sprayed and squeegeed on each layer of fiberglass reinforcing material to ensure that the reinforcing material is completely impregnated and to avoid the formation of air pockets in the final panel.

After the reinforcing material has been laid-up, the resin matrix is cured at a temperature of about 50° to about 150° F., preferably from about 70° to about 120° F., thereby completing the formation of the upper skin 12. The upper skin thickness may vary, but the thickness normally will be from about ⅛ to about ½ inch.

After the upper skin layer 12 has been formed, it is trimmed of any flash. Next, a layer of resin impregnated fiber reinforcing material, such as 1½ oz. per square inch matting of the type used to prepare the upper skin layer is laid-up on the surface of the upper skin layer. Next, the cellular core structure is placed on the resin impregnated matting. The core structure may comprise a variety of light weight, high strength materials, but the use of a core structure comprised of a spaced array of balsa wood blocks, particularly end-grand balsa wood blocks, is preferred because of the exceptionally high strength to weight ratio that is characteristic of such blocks. When using balsa blocks, the blocks should be pre-cut to a length of from about 2 to about 18 inches, a width of from about 2 to about 18 inches, and a thickness of from about ½ to about 2 inches. Blocks on the order of about 4–8 inches in length, 4–8 inches in width, and 1½–1¾ inches in thickness are preferred. The blocks may be pre-wet with resin, preferably of the same composition as the resin that is used to impregnate the fiber reinforcing material, so that the blocks will not soak up resin from the resin impregnated fiber reinforcing material and thereby jeopardize the formation of substantially monolithic panel. In the alternative, the fiber reinforcing material may simply be wet with excess resin. The core blocks 19 should be placed on the upper skin layer in a spaced single layer or planar array such that a small channel-like space 21 is left between each adjacent block. The blocks should also be spaced at least about one-half inch, preferably from about ½ to about 3 inches, from the side walls of the mold (for example, wall 22 in FIG. 5), and the blocks closest to the side walls of the mold should be tapered to conform to the taper of the mold bottom and to the taper desired in the edge portions 24 of the finished panel. One such tapered block 26 is illustrated in FIG. 3. When placing the core blocks on the impregnated fiber mat, the blocks should be pressed down slightly so that some of the resin works its way up into the spaces 21 between the adjacent blocks. It is also preferred to work resin down into the spaces 21 from above so as to ensure that the spaces are completely filled with resin and that no air bubbles remain.

The resin in the spaces 21, in the fiber reinforcing material 19, and on the upper skin layer 12 is then cured from about ½ to about 1 hour. After this curing step, additional resin is applied around the edges of the core array and individual core blocks making sure that all voids, i.e., potential air pockets, are filled with resin. The added resin is then permitted to set at a temperature of about 50° to about 150° F., preferably between 70° and about 120° F., for at least 10–15 minutes and a resin coat is applied to any remaining exposed areas of the core blocks before laying up the lower skin layer 11.

The lower skin layer 11 is laid up in a manner similar to that for the upper layer e.g., with a plurality of layers of resin impregnated fiber reinforcing material. In one preferred embodiment, the lower skin layer 11 is formed by placing a resin wetted 1½ oz. per square yard fiberglass matting over the resin coated core blocks, followed by a layer of 36 oz. per square yard fiberglass roving, a layer resin wetted of ¾ oz per square yard fiberglass matting, and another layer of 36 oz per square yard fiberglass roving. The resin on the core blocks and in the various reinforcing layers is then cured at a temperature of about 50° to about 150° F., preferably between 70° and about 120° F., for about ¼ to about 1 hour and the edge portions of the panel are built-up with resin wet 2 oz. per square yard fiberglass matt blotter. Once built, the edge portions are filled with a continuous fiber stand, such as that sold by PPG Industries under the designation HB600-205-HT50.

After setting for another ½ to ¾ hours, the lower skin layer is built-up further with additional layers of resin wet reinforcing material. The additional layers may comprise, e.g., in order, 1½ oz. per square yard matting, 36 oz. per square yard roving, 1½ oz. per square yard matting, and 36 oz. per square yard roving. The resin wet layers are then allowed to cure for about ¼ to about 1 hour, any flashing is trimmed, and the resulting lower skin layer is ground or polished so that it surface is flat. A final gel coat layer is applied to the back of the lower skin layer and the panel is removed from the mold and allowed to cure at a temperature on the order of about 50° to about 150° F., preferably between 70° and about 120° F., for at least 12 hours.

Composite structural panels prepared in the manner outlined above are particularly suitable for use as roadway opening cover plates and when such use is contemplated, the panels are provided with suitably located anchor holes 23 (FIG. 4). The anchor holes may be located, for example, at the corners of a square or rectangular panel, or through the peripheral edge portion of a circular panel, and should be large enough to receive an appropriate anchor. Anchor holes on the order of from about ¾ to about 1¾ inches in diameter generally would be suitable.

A typical roadway cover panel would comprise a 5 foot wide by 6 foot long, by 2 inch thick composite panel having a six inch wide edge portion that tapers down to about ½ inch in thickness. The tapered edge portion may thus function as a ramp. Such a panel would weigh less than 200 lbs, normally about 180 lbs., and would be characterized by an H-20 rating (an ability to carry a static axle load of 32,000 lbs and an impact load of 41,600 lbs) even when supported only on two sides, thus giving it the strength needed to safely cover ground holes or openings in heavily trafficked roadway surfaces.

Because of its light weight, roadway opening covers prepared in accordance with the present invention could be delivered to a job site in a conventional van or pick-up truck. Furthermore, they do not require any special equipment or crew standing by at a job site, and can be handled easily and installed by two people. These light weight roadway openings covers also eliminate many of the safety problems associated with the currently employed steel plates, e.g. workmen's compensation claims or traffic accidents.

Even with its light weight the composite panels of this inventions have a slightly greater rigidity than a steel plate. Under maximum point loading the present composite panels will exhibit a center deflection of only 0.96 inches, which is slightly less than that of steel. Unlike steel, the present panels have memory that allows them to spring back, preventing the ends from curling. Moreover, because they can be anchored to the ground, the present panels will not creep nor curl, and because of the taped ramped edge portions, there is no need to waste crew time black-topping around the sides of the panels to ease impact or to keep the panels in position.

While the panel illustrated in FIGS. 1 and 2 have four tapered sides or edge portions 24 and is very well suited for use as a stand-alone panel to cover road holes, it will be appreciated that the number of tapered sides is merely a matter of choice. For example, panels may be designed with three tapered sides so as to be used as end plates, or with two tapered sides so as to function as center plates. Panels with one tapered side also are contemplated.

As indicated above, the composite panels of this invention may be anchored in place. This is an important aspect of the present invention since this anchoring will prevent any sidewards or upwards movement of the panels even in the rush of heavy bus and truck traffic. The panels may be anchored by any suitable means. For example, when a panel is to be anchored to a cement or asphalt surface, up to a 10 inch deep by 1½ inch diameter hole may be drilled in the ground beneath each anchor hole in the panel. A tapped female socket may then be inserted into each hole, and a bolt, preferably a grade 5 or higher, may then be inserted through each anchor hole in the panel. The bolt may then be locked down to anchor or lock the panel in place.

It is to be understood that the above-described embodiments are simply illustrative of the principles of the inventions, and that various other modifications and changes may be devised by those skilled in the art which will embody the principles of the invention and fall within the spirit and scope thereof as set forth in the following claims.

What is claimed is:

1. A ground opening cover, which comprises:
   a substantially flat lower facing layer for supporting said cover on the ground while said cover spans an opening in the ground;
   an upper facing layer which is spaced from said lower facing layer and which extends substantially parallel thereto;
   core means disposed between said facing layers, said core means comprising a plurality of generally square or rectangular cellular blocks having flat upper and lower surfaces lying substantially parallel to said upper and lower facing layers and having substantially flat side walls disposed generally perpendicular to said upper and lower facing layers, said cellular blocks being disposed in a spaced planar array in a single layer such that the side walls of each adjacent pair of blocks define a channel-like spaces which extend between each adjacent pair of blocks generally perpendicularly from said lower facing layer to said upper facing layer, said blocks having a length and width substantially greater than the thickness thereof and being characterized by a high strength to weight ratio;
   said upper and lower facing layers comprising a fiber reinforced hardenable resin material selected from the group consisting of epoxies, phenolics, nylons, polyesters, polyurethanes and polysulfones;
   said hardenable resin material additionally being disposed in said channel-like spaces between said cellular blocks and on all of the surfaces of said blocks so as to essentially exclude any air from being trapped in said ground opening cover;
   said hardenable resin material in said channel-like spaces and on said surfaces of said blocks being integrally bonded to said hardenable resin material in said upper and lower facing layers so as to form said ground cover into a substantially air bubble-free monolithic composite having an ability to carry a static axle load of 32,000 lbs. and an impact load of 41,600 lbs. even when said cover is supported only on two sides while spanning a ground opening;
   said ground cover having at least one peripheral edge portion which is tapered such that thickness of said edge portion decreases when measured away from the center and toward the periphery of said cover, said peripheral edge portion defining a ramp-like incline adapted to facilitate vehicular traffic over said cover.

2. The ground opening cover of claim 1, wherein said edge portion is provided with at least one hole therethrough, said hole being adapted to receive means for anchoring said cover over a ground opening.

3. The ground opening cover of claim 2, wherein said monolithic composite comprises a generally rectangular, square or circular configuration.

4. The ground opening cover of claim 3, wherein said generally rectangular block-shaped members comprise balsa wood blocks.

5. The ground opening cover of claim 4, wherein said balsa wood blocks have a length of from about 2 to about 18 inches, a width of from about 2 to about 18 inches, and a thickness of from about ½ to about 2 inches.

6. The ground opening cover of claim 5, wherein each of said balsa wood blocks located in the portion of said edge portion which is tapered is tapered so as to correspond to the general tapered configuration of said edge portion.

7. The ground opening cover of claim 5, wherein said balsa wood blocks are spaced at least about one inch from the periphery of said panel structure, wherein said upper and lower facing layers are from about 3/16 to about ½ inches thick, and wherein said balsa wood blocks are spaced from each other to define a channel-shaped space between adjacent blocks that is from about 1/32 to about 7/16 inches thick, said space being filled with said hardenable resin material.

8. The ground opening cover of claim 5, wherein said hardenable resin material is further reinforced with light weight, high strength spherical beads or particulate matter.

9. The ground opening cover of claim 2, wherein said core means comprises a spaced, generally planar array of balsa wood blocks, and wherein said balsa wood blocks have a length of from about 2 to about 18 inches, a width of from about 2 to about 18 inches, and a thickness of from about ½ to about 2 inches.

10. The ground opening cover of claim 9, wherein each of said balsa wood blocks located in said tapered edge portions tapered so as to correspond to the general tapered configuration of said edge portion.

11. The ground opening cover of claim 10, wherein said balsa wood blocks are spaced at least about one inch from the periphery of said panel structure, wherein said upper and lower facing layers are from about 3/1 6 to about ½ inches thick, and wherein said balsa wood blocks are spaced from each other to define a channel-shaped space between adjacent blocks that is from about 1/32 to about 7/16 inches thick, said space being filled with said hardenable resin material.

12. The ground opening cover of claim 9, wherein said hardenable resin material is further reinforced with light weight, high strength spherical beads or particulate matter.

13. The ground opening cover of claim 2, wherein said hardenable resin material is further reinforced with light weight, high strength spherical beads or particulate matter.

* * * * *